United States Patent
Grady et al.

(10) Patent No.: US 7,837,437 B2
(45) Date of Patent: Nov. 23, 2010

(54) TURBINE NOZZLE SEGMENT AND REPAIR METHOD

(75) Inventors: Wayne R. Grady, Fairfield, OH (US); Timothy L. Siebert, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 837 days.

(21) Appl. No.: 11/683,005

(22) Filed: Mar. 7, 2007

(65) Prior Publication Data
US 2008/0273971 A1 Nov. 6, 2008

(51) Int. Cl.
*F01D 9/02* (2006.01)
(52) U.S. Cl. .................. 415/191; 415/209.3; 29/889.1
(58) Field of Classification Search .................. 415/191, 415/173.7, 208.1, 209.3; 29/889.1
See application file for complete search history.

(56) References Cited
U.S. PATENT DOCUMENTS

| | | | | |
|---|---|---|---|---|
| 4,767,267 A | * | 8/1988 | Salt et al. .................. | 415/173.7 |
| 4,889,470 A | * | 12/1989 | Scalzo ...................... | 415/209.2 |
| 5,062,767 A | * | 11/1991 | Worley et al. ............. | 415/209.3 |
| 5,269,057 A | * | 12/1993 | Mendham .................. | 29/889.1 |
| 5,584,654 A | * | 12/1996 | Schaefer et al. ........... | 415/209.3 |
| 6,354,797 B1 | * | 3/2002 | Heyward et al. ............ | 415/191 |
| 6,416,278 B1 | | 7/2002 | Caddell, Jr. et al. | |

* cited by examiner

*Primary Examiner*—Igor Kershteyn
(74) *Attorney, Agent, or Firm*—Adams Intellectual Property Law; Stephen Friskney

(57) ABSTRACT

A method of repairing a turbine nozzle segment having at least one vane disposed between outer and inner bands. The method includes using an salvageable part, such as honeycomb backing strip remnant, from a nozzle segment that is unrepairable, and joining the honeycomb backing strip to a replacement casting. The replacement casting includes a tenon formed on the inner band that mates with a mortise formed on the back side of the honeycomb backing strip. A nozzle segment and nozzle segment casting used in connection with the method is also disclosed.

9 Claims, 6 Drawing Sheets

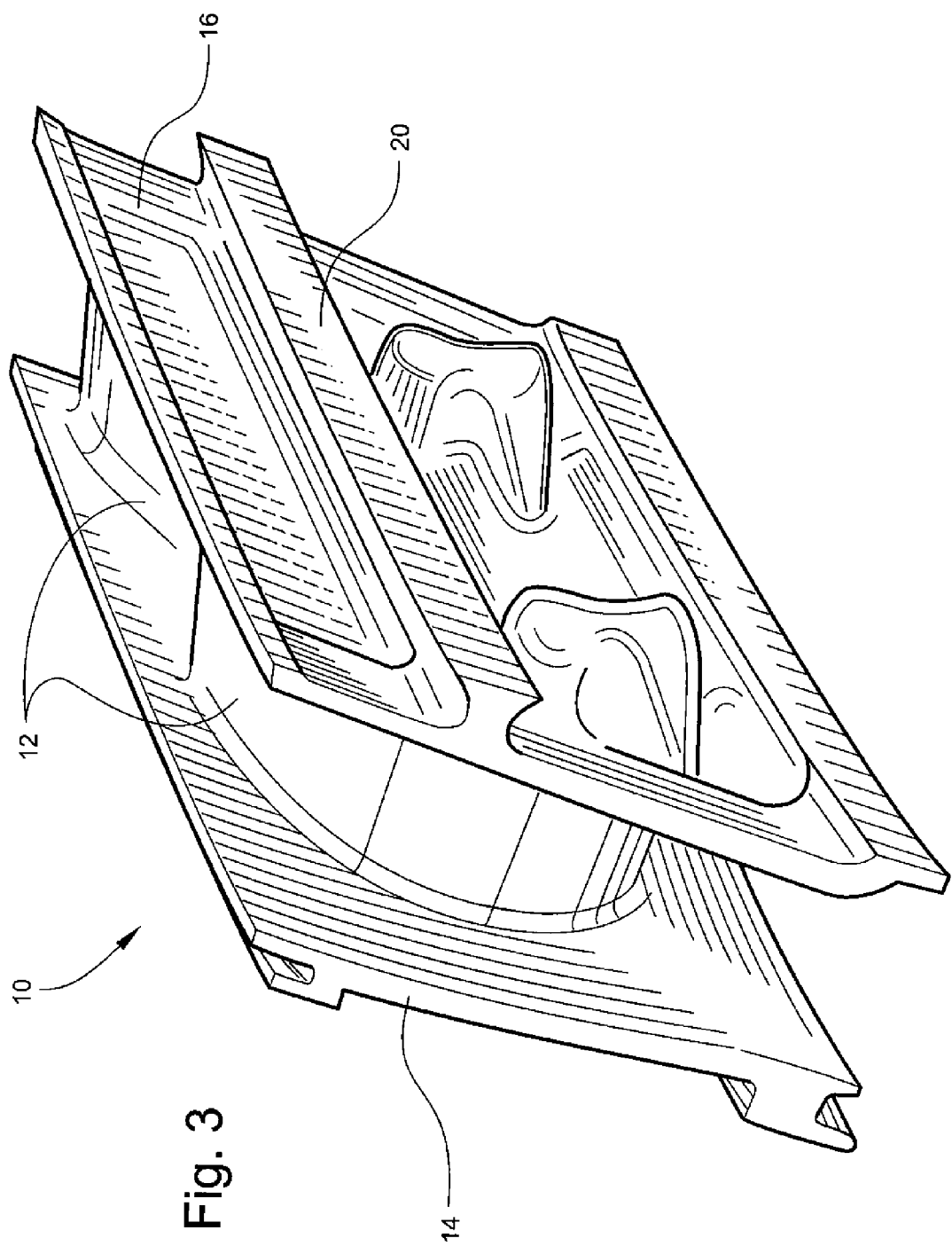

TURBINE NOZZLE SEGMENT AND REPAIR METHOD

BACKGROUND OF THE INVENTION

The field of this invention relates generally to gas turbine engines and more particularly to the repair of turbine nozzle segments used in turbine engines. A gas turbine engine includes a compressor that provides pressurized air to a combustor. Air is mixed with fuel in the combustor and ignited, generating hot combustion gases. These gases flow downstream to a turbine section where energy is extracted to power the compressor and provide useful work, such as powering an aircraft. Aircraft engines typically include stationary turbine nozzles that enhance engine performance by directing gas flow within the turbine section. In multi-stage turbine sections, turbine nozzles are placed at the entrance of each turbine stage to channel combustion gases into the turbine rotor located downstream of the nozzles. Turbine nozzles are typically circumferentially segmented, with each nozzle segment having one or more vanes positioned between inner and outer bands that define the radial flowpath boundaries for the hot combustion gases flowing through the nozzles. These nozzle segments are mounted to the engine casing to form an annular array with the vanes extending radially between the rotor blades of adjacent turbine stages.

Various approaches have been proposed for manufacturing and repairing nozzle segments. In one approach, the nozzle segment is a multi-piece assembly comprising an inner band, an outer band and one or more vanes, each of which is individually cast. Both the inner and outer bands are provided with slots into which the ends of the vanes are brazed in place to form the nozzle segment assembly. Another approach is to integrally cast the nozzle segment with the vanes, inner band and outer band formed together as a one-piece casting.

Nozzle segments are exposed during operation to a high temperature, corrosive gas stream that limits their effective service life. Accordingly, nozzle segments are typically fabricated from high temperature cobalt or nickel-based superalloys coated with corrosion and/or heat resistant materials. The nozzle segments are ordinarily cooled internally with cooling air extracted from the compressor to prolong service life. Even with such efforts, portions of the nozzle segments, particularly the vanes, can become cracked, corroded, and otherwise damaged such that the nozzle segments must be either repaired or replaced to maintain safe, efficient engine operation. Conventional repair methods involve weld or alloy repair of the damaged regions of the nozzle segment. Because nozzle segments are complex in design, are made of relatively expensive materials, and are expensive to manufacture, it is desirable to repair them whenever possible, rather than replace them with new nozzle segments.

U.S. Pat. No. 6,416,278 ("'278 patent") refers to nozzle segments that were damaged during engine operation to the point where they could not be repaired by then known repair processes. The '278 patent discloses a method for repairing a turbine nozzle segment that includes separating the inner band from the nozzle segment, and joining the inner band to a newly manufactured replacement casting having an outer band and at least one vane. The replacement casting includes a mounting platform formed on one end of the vane and a boss formed on the mounting platform. A collar is joined to the inner band and has a slot formed therein. The boss is then inserted into the slot, and the mounting platform is received in a recess formed in the inner band. Joinder of the collar to the nozzle segment is completed by joining the boss to the collar and the mounting platform to the inner band. However, the size of the nozzle segment is integral to the use of the repair method disclosed in the '278 patent. Stage 2 HPT nozzle segments of the type disclosed in this application are of a size rendering them incapable of accepting a collar during the re-application of the airfoils, as described in the '278 patent. The repair method disclosed in the '278 patent is also limited by the length and width of any crack, the degree of erosion of the parent material, and the wall thickness of the nozzle segment.

In some instances replacement of the turbine nozzle vane airfoil is necessary, as opposed to conventional repair. At present, this is accomplished by discarding the entire nozzle segment and replacing it with a completely new replacement part. This involves discarding components of the nozzle segment with remaining useful life along with worn or damaged parts. In particular, the honeycomb backing strip of a nozzle segment often has remaining life even though the rest of the nozzle segment is damaged or worn beyond repair. The honeycomb backing strip is fabricated with very expensive alloys, so that the ability to reuse this component would result in substantial savings. Therefore, there is a need for a method of repairing a turbine engine nozzle segment that permits reuse of honeycomb backing strips removed from nozzle segments that are otherwise damaged or worn beyond repair, and must therefore be discarded and replaced. There is also a need for a method of repairing a turbine engine nozzle segment that permits the worn parts of the nozzle segment to be replaced with parts fabricated of enhanced materials in order to achieve greater part longevity and operational efficiency.

SUMMARY OF THE INVENTION

The invention disclosed and claimed in this application meets this need by providing a method of repairing a turbine nozzle segment having at least one vane disposed between outer and inner bands. The method includes removing and re-using the honeycomb backing strip remnant from a field returned nozzle segment that cannot be otherwise be repaired, and joining the removed honeycomb strip to a newly manufactured replacement casting having an outer band, inner band, and at least one vane. The replacement casting includes a tenon formed on the inner band that mates with a mortise formed on the back side of the honeycomb backing strip.

According to one aspect of the invention, a method of repairing a turbine nozzle segment having at least one vane disposed between outer and inner bands includes separating a salvageable nozzle element from the inner band of a turbine nozzle segment and attaching the salvaged nozzle element to the inner band of a replacement casting having an outer band and at least one vane. A tenon on the inner band and a mortise on the nozzle element may be used to join the replacement casting and re-used nozzle element to each other.

According to another aspect of the invention, a method of repairing a turbine nozzle segment having at least one vane disposed between outer and inner bands includes separating a salvageable honeycomb backing strip from the inner band of an otherwise unsalvageable turbine nozzle segment, machining a mortise into a back side of the honeycomb backing strip, and machining a tenon onto the inner band of a integrally-formed replacement casting having an outer band and at least one vane. The tenon of the inner band is positioned into the mortise of the honeycomb backing strip and the tenon and mortise are brazed to each other.

According to another aspect of the invention, a turbine nozzle segment is provided, including a turbine nozzle segment casting having at least one vane disposed between an outer band and an inner band, a tenon formed onto the inner band, and an inner band element having a mortise formed in a back side of the inner hand element, positioned in mating relation on the tenon and secured thereto.

According to another aspect of the invention, a casting for a turbine nozzle segment is provided, and includes a casting having at least one vane disposed between an outer band and an inner band, and a tenon formed onto the inner band and adapted to receive an inner band element having a mortise formed in a back side thereof for being positioned in mating relation on the tenon and secured thereto.

BRIEF DESCRIPTION OF THE DRAWINGS

The subject matter of this application is explained with reference to the following description taken in conjunction with the accompanying drawing figures, in which:

FIG. 3 is a perspective view of a replacement casting for a turbine nozzle segment with a tenon formed on the inner band in the area of the integrally-cast T-bar;

DETAILED DESCRIPTION OF THE INVENTION

Figure 2:
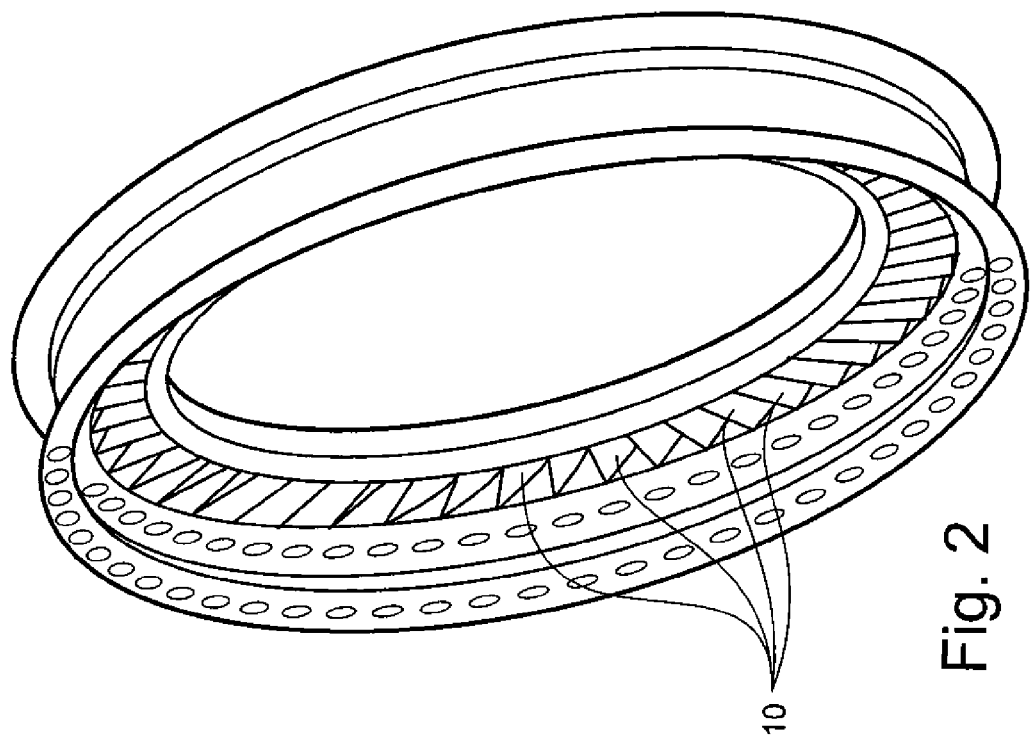
FIG. 2 is an enlarged overall view of the turbine nozzle array of FIG. 1.
Figure 1:
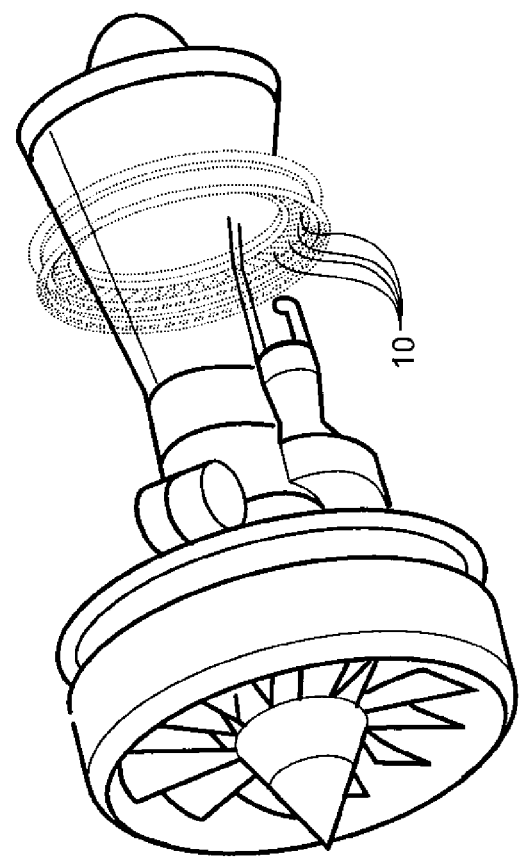
FIG. 1 is an overall perspective view of a turbine engine indicating the location of a circumferential array of turbine nozzles.

Referring to the drawings wherein identical reference numerals denote the same elements throughout the various views, FIG. 1 is a perspective view of a high bypass turbine engine of the type having an annular array of stage 2 HPT nozzle segments 10, as described below. The gas turbine engine, such as shown by way of example in FIG. 1, includes a plurality of nozzle segments 10 arranged circumferentially in an annular configuration, also as shown in FIG. 2. While the repair method of the present invention is described herein with respect to a two-vane nozzle segment of a stage 2 HPT nozzle, the repair method described in this application is equally applicable to nozzle segments having any number of vanes and utilized in other engine locations.

During engine operation, a nozzle segment can experience damage from, for example, local gas stream over-temperature or foreign object impacts. As mentioned above, a portion of the nozzle segment 10 may become damaged to the point where it cannot be repaired by known repair processes. The present invention is directed to a method of repairing a nozzle segment in which the honeycomb backing strip is salvageable, while other nozzle segment structures are non-repairable. The present invention is most applicable to integrally cast nozzle segments, but can be used with other types of nozzle segments, as well. In addition, replacement of the nozzle segment structures permits these structures to be fabricated from materials having enhanced operational and length-of-service characteristics. As a result, savings result both from the ability to re-use the honeycomb backing strip and the ability to attach it to a replacement casting having enhanced longevity and operational characteristics.

Figure 5:
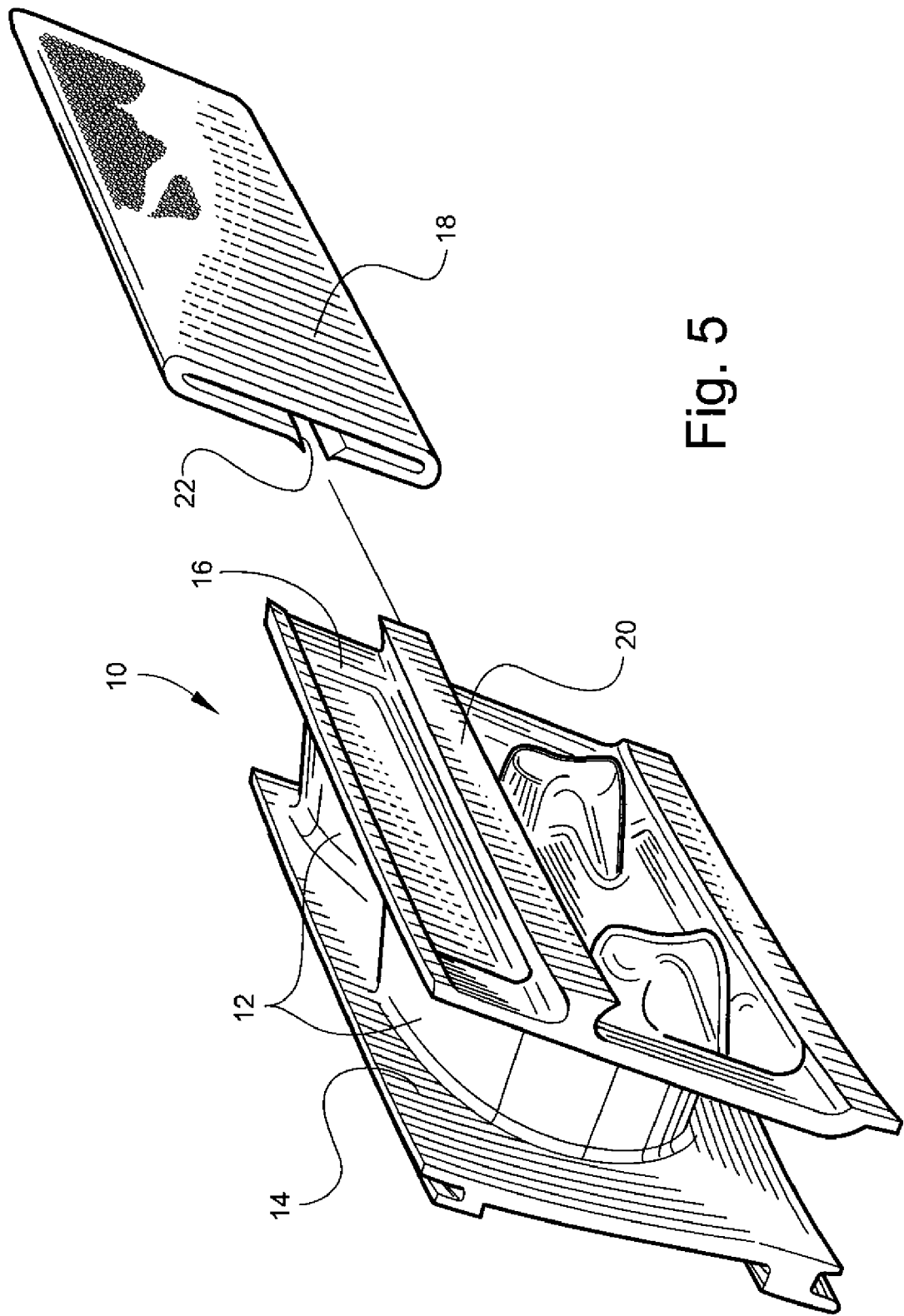
FIG. 5 is a perspective view of the turbine nozzle segment with the honeycomb backing strip in place on the tenon of the inner band.

Referring now to FIG. 3, a casting for a turbine nozzle segment 10 is shown, having first and second nozzle vanes 12. The vanes 12 are integrally-formed with and positioned between an arcuate outer band 14 and an arcuate inner band 16. The vanes 12 define airfoils configured to direct the combustion gases to a downstream turbine rotor (not shown). The outer and inner bands 14 and 16 define the outer and inner radial boundaries, respectively, of the gas flow through the nozzle segment 10. The nozzle segment 10 is preferably made of a high quality superalloy, such as a cobalt or nickel-based superalloy, and may be coated with a corrosion resistant material and/or thermal barrier coating. The casting, for example, a casting for a nozzle segment for a CFM-34 turbine engine, is machined to transform a conventional T-bar web on the inner band 16 into the tenon 20 described above. The tenon 20 thus extends along the inner band 16, as best shown in FIGS. 3 and 5.

Figure 4:
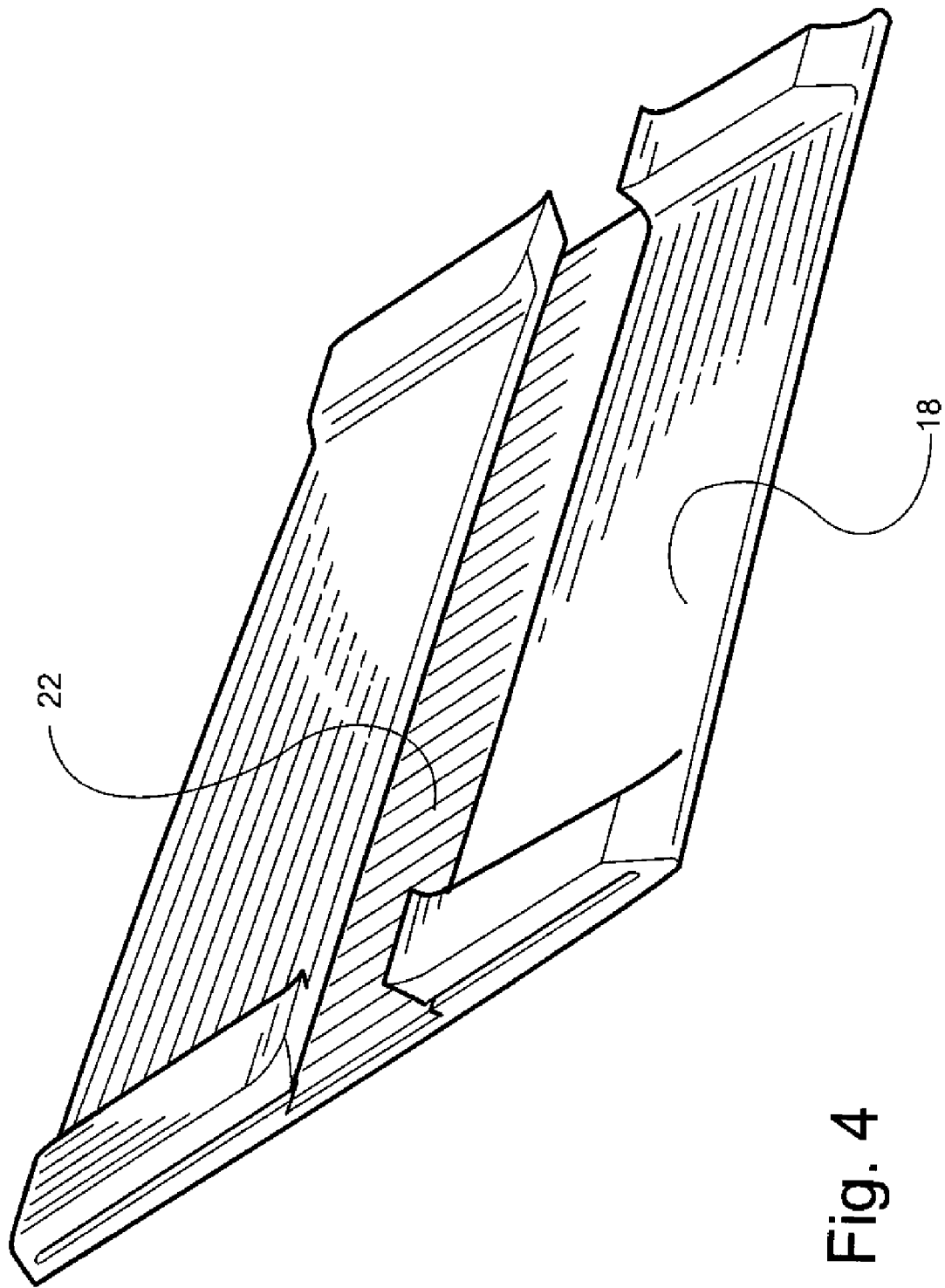
FIG. 4 is a perspective view of the honeycomb backing strip with a mortise formed on the back side.

The repair method includes separating a usable honeycomb backing strip 18, shown in FIG. 4, from an otherwise unsalvageable nozzle segment, and then joining the honeycomb backing strip 18 to a newly manufactured casting, such as shown in FIG. 3, that replaces the nozzle structure from which the honeycomb backing strip 18 was removed. Before initiating this repair method, engine run nozzle segments returned from the field for servicing are inspected to identify nozzle segments that have usable honeycomb backing strip remnants but where the other nozzle segment structure is unsalvageable.

The honeycomb backing strip 18 removed from a damaged nozzle segment is cleaned, stripped of corrosion or other residue and otherwise reconditioned. A mortise 22 shaped and positioned to receive the tenon 20 of the inner band 16 is then machined into the back side of the honeycomb backing strip 18, as shown in FIGS. 4 and 5.

Figure 6:
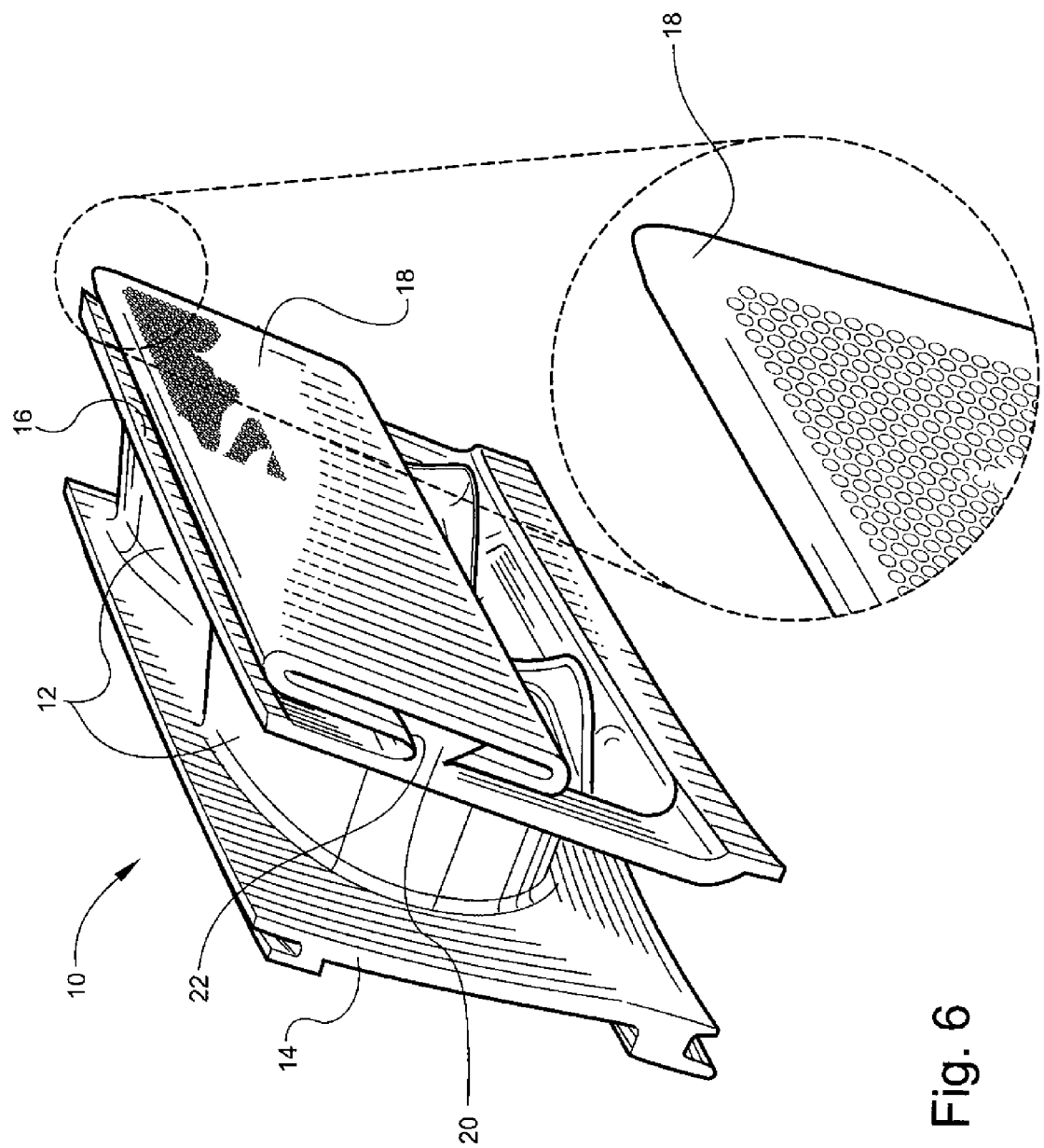
FIG. 6 is a top plan view of the turbine nozzle segment shown in FIG. 3.
Figure 7:
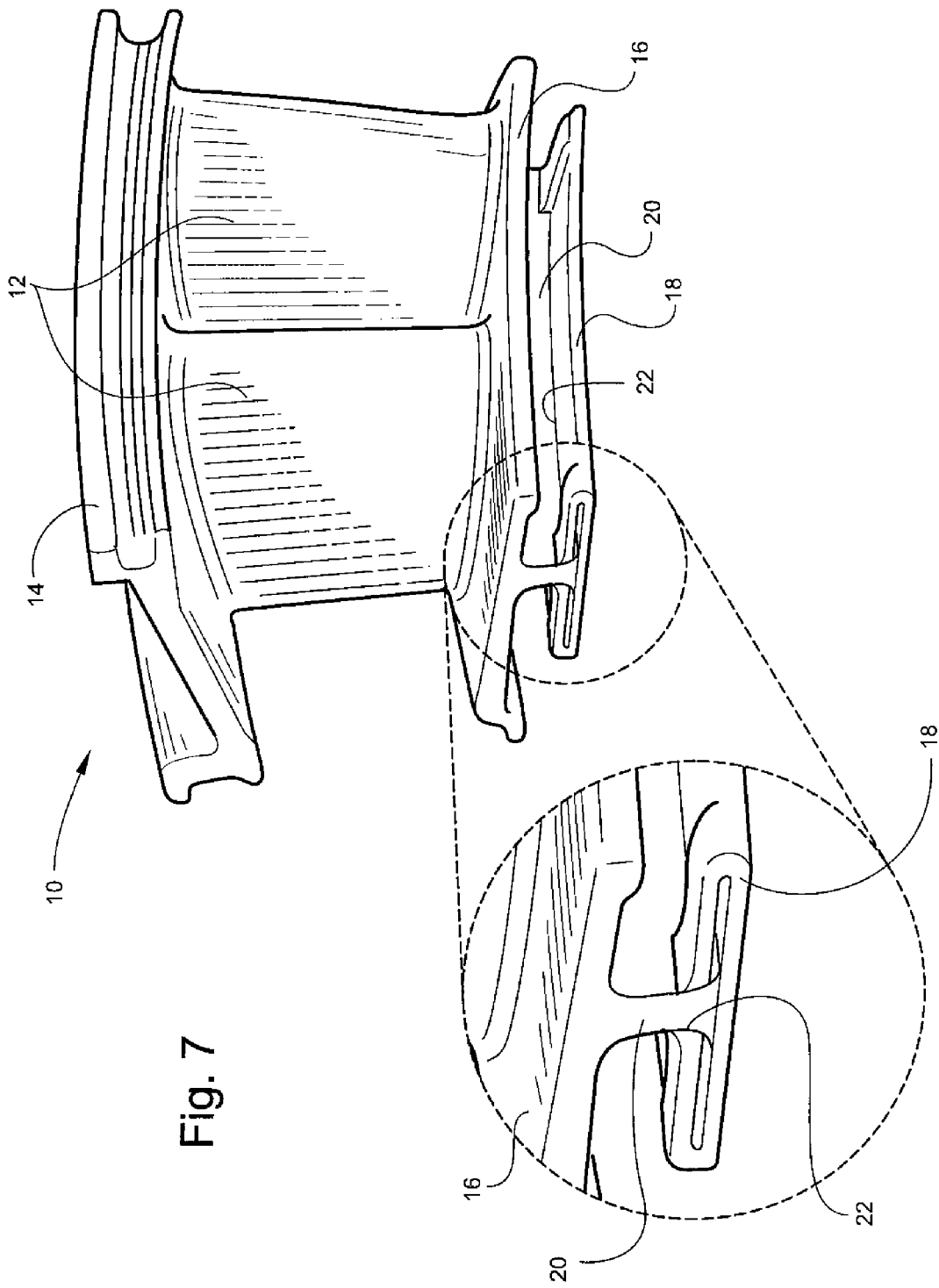
FIG. 7 is a perspective view of the turbine nozzle segment showing details of the mortise and tenon attachment.

When properly positioned, the honeycomb backing strip 18 is brazed to the tenon 20. Alternatively, a conventional low-energy welding process, election-beam welding process, or another suitable known joining process may be used. Any corrosion or thermal coatings that were originally applied to the nozzle segment 10 are reapplied in a known manner. The result is a repaired nozzle segment 10, as shown in FIGS. 6 and 7. The nozzle segment 10 is fully interchangeable with conventional nozzle segments with integrally-formed honeycomb backing strips, and provides savings resulting from the ability to re-use honeycomb backing strips having remaining useful life, and from the ability to replace the damaged parts of the nozzle segment with a new casting having enhanced performance and useful life.

The foregoing has described a repair method for turbine nozzle segments as well as a turbine nozzle and a replacement casting for a turbine nozzle used in the repair process. While specific embodiments of the present invention have been described, it will be apparent to those skilled in the art that various modifications can be made without departing from the spirit and scope of the invention as defined in the appended claims.

We claim:

1. A method of repairing a turbine nozzle segment having at least one vane disposed between outer and inner bands, comprising:
    separating a salvageable nozzle element from the inner band of a turbine nozzle segment;
    forming a mortise into a back side of the nozzle element;
    forming a tenon onto the inner band of a replacement casting having an outer band and at least one vane;
    positioning the tenon of the inner band into the mortise of the nozzle element; and
    securing the tenon and mortise to each other.

2. The method of claim 1 wherein the step of securing the tenon and mortise to each other comprises brazing, conventional or electron beam welding.

3. The method of claim 1 wherein forming a mortise into a back side of the nozzle element comprises machining the mortise.

4. The method of claim 1 wherein forming a tenon onto the inner band of a replacement casting comprises machining the tenon.

5. The method of claim 1, wherein forming a tenon onto the inner band of a replacement casting comprises forming the tenon onto the inner band of a stage 2 HPT nozzle segment.

6. The method of claim 1, wherein forming a tenon onto the inner band of a replacement casting comprises forming the tenon onto the inner band of an integrally-formed nozzle segment casting.

7. The method of claim 1, wherein separating a salvageable nozzle element from the inner band of a turbine nozzle segment comprises separating a honeycomb backing strip from the inner band.

8. A method of repairing a turbine nozzle segment having at least one vane disposed between outer and inner bands, comprising:
    separating a salvageable honeycomb backing strip from the inner band of an otherwise unsalvageable turbine nozzle segment;
    machining a mortise into a back side of the honeycomb backing strip;
    machining a tenon onto the inner band of a integrally-formed replacement casting having an outer band and at least one vane:
    positioning the tenon of the inner band into the mortise of the honeycomb backing strip; and
    brazing the tenon and mortise to each other.

9. The method of claim 8, wherein forming a tenon comprises forming the tenon onto the inner band of a stage 2 HPT nozzle segment.

* * * * *